(12) United States Patent
Wakayama et al.

(10) Patent No.: US 11,380,120 B2
(45) Date of Patent: Jul. 5, 2022

(54) DRIVING ASSISTANCE DEVICE

(71) Applicant: HONDA MOTOR CO., LTD., Tokyo (JP)

(72) Inventors: Ryoji Wakayama, Wako (JP); Kazuma Ohara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/832,772

(22) Filed: Mar. 27, 2020

(65) Prior Publication Data

US 2020/0311400 A1    Oct. 1, 2020

(30) Foreign Application Priority Data

Mar. 29, 2019  (JP) .............................. JP2019-065417

(51) Int. Cl.
| | |
|---|---|
| *G06V 40/10* | (2022.01) |
| *G06T 7/70* | (2017.01) |
| *G06T 7/20* | (2017.01) |
| *B60W 30/095* | (2012.01) |
| *G06V 20/58* | (2022.01) |
| *G08G 1/16* | (2006.01) |

(52) U.S. Cl.
CPC ......... *G06V 40/10* (2022.01); *B60W 30/0956* (2013.01); *G06T 7/20* (2013.01); *G06T 7/70* (2017.01); *G06V 20/58* (2022.01); *G06T 2207/30196* (2013.01); *G06T 2207/30236* (2013.01); *G06T 2207/30261* (2013.01); *G08G 1/166* (2013.01)

(58) Field of Classification Search
CPC ........... G06K 9/00362; G06K 9/00805; G06K 9/00369; G06T 7/70; G06T 7/20; G06T 2207/30261; G06T 2207/30196; G06T 2207/30236; G06T 7/11; B60W 30/0956; G08G 1/166; G01S 17/931; G01S 17/86; G01S 13/08; G01S 17/08; G01S 17/894
USPC ....................................................... 382/103
See application file for complete search history.

(56) References Cited

U.S. PATENT DOCUMENTS

| | | | |
|---|---|---|---|
| 2008/0222113 A1* | 9/2008 | Baba | G06K 9/6204 |
| 2019/0353497 A1* | 11/2019 | Murashita | G01C 21/3667 |
| 2020/0074679 A1* | 3/2020 | Masui | G06K 9/00369 |
| 2020/0309560 A1* | 10/2020 | Matsunaga | B60K 37/06 |

FOREIGN PATENT DOCUMENTS

WO    2018/207351 A1    11/2018

* cited by examiner

*Primary Examiner* — Amandeep Saini
(74) *Attorney, Agent, or Firm* — Carrier Blackman & Associates, P.C.; Joseph P. Carrier; Jeffrey T. Gedeon (57) ABSTRACT

In a driving assistance device, a human body specifying unit acquires, as human body information, an image of a human body existing around a host vehicle in image data acquired by a camera. A quasi-skeleton estimation unit estimates a quasi-skeleton of the human body from the human body information. The radar or the LiDAR measures a distance to a part of the human body that corresponds to the quasi-skeleton.

5 Claims, 7 Drawing Sheets

DRIVING ASSISTANCE DEVICE

CROSS-REFERENCE TO RELATED APPLICATION

This application is based upon and claims the benefit of priority from Japanese Patent Application No. 2019-065417 filed on Mar. 29, 2019, the contents of which are incorporated herein by reference.

BACKGROUND OF THE INVENTION

Field of the Invention

The present invention relates to a driving assistance device that assists driving of a movable body.

Description of the Related Art

For example, International Publication No. WO 2018/207351 discloses that a camera photographs a human body and on the basis of an image of the human body, joint positions of the human body are connected with skeletons, whereby, skeleton information of the human body is generated.

SUMMARY OF THE INVENTION

Incidentally, when a driving assistance device that assists driving of a host vehicle (movable body) has recognized a human body ahead of the host vehicle, first, an image of the human body is photographed with a camera (visual sensor). Next, a frame including the human body in the photographed image is defined. Then, a quasi-pyramid (area where human body is assumed to exist) corresponding to the frame is set, and the top (reference position) of this quasi-pyramid corresponds to a place where a distance measurement sensor is disposed. By using this distance measurement sensor, the distances to an inner part of the pyramid are measured. Next, by using each distance measured by the distance measurement sensor and the image of the human body, the human body is recognized.

However, this method performs the distance measurement for the entire inner part of the pyramid; thus, the distances other than those to the human body in the pyramid are also measured. Accordingly, when a recognition process for recognizing the human body is performed using the measured distances, the distances other than the distance to the human body are noise and the noise makes it difficult to accurately recognize the human body. Moreover, the process burden in the recognition process is large.

On the other hand, the technique according to International Publication No. WO 2018/207351 can generate the skeleton information of the human body. However, International Publication No. WO 2018/207351 has failed to disclose how this technique is applied to the driving assistance device to recognize the human body.

The present invention has been made in view of the above problems and an object is to provide a driving assistance device that can recognize the human body accurately and reduce the process burden in the recognition process.

An aspect of the present invention is a driving assistance device configured to assist driving of a movable body, the driving assistance device including: a visual sensor configured to acquire an image around the movable body; a distance measurement sensor configured to measure a distance to an object around the movable body; a human body information acquisition unit configured to acquire, as human body information, an image of a human body existing around the movable body in the image acquired by the visual sensor; and a quasi-skeleton estimation unit configured to estimate a quasi-skeleton of the human body from the human body information. In this case, the distance measurement sensor measures a distance to a part of the human body that corresponds to the quasi-skeleton.

According to the present invention, the quasi-skeleton of the human body is estimated from the image of the human body (human body information) and only the distance to the part of the human body that corresponds to the estimated quasi-skeleton is measured with the distance measurement sensor. Thus, the measurement range of the distance measurement sensor can be narrowed to the human body part only, and the measurement of the distances to points other than the human body can be suppressed. As a result, the human body can be recognized with high accuracy.

In addition, since the measurement range of the distance measurement sensor is narrowed, the amount of information about the measurement result from the distance measurement sensor can be reduced. Thus, the process burden in the recognition process for recognizing the human body can be reduced.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

A preferred embodiment of a driving assistance device according to the present embodiment is hereinafter described with reference to the attached drawings.

1. Structure of the Present Embodiment

<1.1 Overall Structure of Driving Assistance Device 10>

Figure 1:
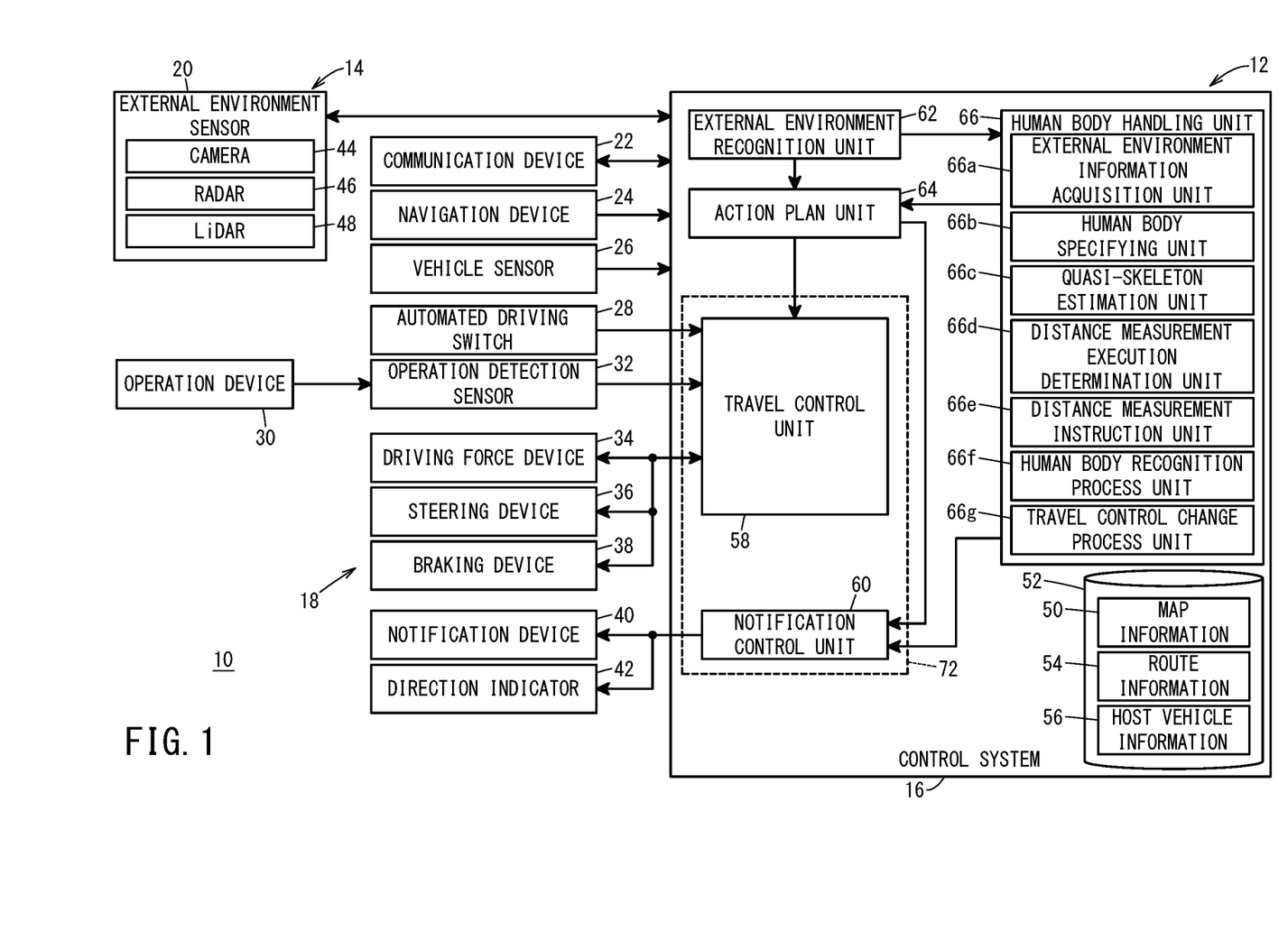
FIG. 1 is a structure diagram of a host vehicle including a driving assistance device according to one embodiment.

FIG. 1 is a block diagram that illustrates a structure of a driving assistance device 10 according to one embodiment of the present invention. The driving assistance device 10 is incorporated into a vehicle 12 (hereinafter also referred to as host vehicle 12), and performs travel control of the host vehicle 12 (movable body) automatically or manually. Note that "travel control" refers to control regarding the travel of the host vehicle 12 including at least acceleration/deceleration control of the host vehicle 12. In the case where "travel control" is performed by "automated driving", the term "automated driving" refers to a concept including not just "fully automated driving" in which the travel control (travel assistance) of the host vehicle 12 is fully automated but also "partial automated driving" in which the travel control (travel assistance) is partially automated.

As illustrated in FIG. 1, the driving assistance device 10 basically includes an input system device group 14, a control system 16, and an output system device group 18. Devices in the input system device group 14 and the output system device group 18 are connected to the control system 16 through communication lines.

The input system device group 14 includes an external environment sensor 20, a communication device 22, a navigation device 24, a vehicle sensor 26, an automated driving switch 28, and an operation detection sensor 32 that is connected to an operation device 30.

The output system device group 18 includes a driving force device 34 that drives wheels (not shown), a steering device 36 that steers the wheels, a braking device 38 that brakes the wheels, a notification device 40 that notifies a driver visually or audibly, and a direction indicator 42 that notifies to the outside, a right or left direction to which the host vehicle 12 will turn.

<1.2 Specific Structure of Input System Device Group 14>

The external environment sensor 20 acquires information expressing an external environment state of the host vehicle 12 (hereinafter referred to as external environment information), and outputs the acquired external environment information to the control system 16. Specifically, the external environment sensor 20 is formed by a camera 44 (visual sensor), a radar 46 (distance measurement sensor), and a LiDAR (Light Detection and Ranging, Laser Imaging Detection and Ranging) 48 (distance measurement sensor).

The communication device 22 is structured so as to be able to communicate with external devices including a roadside machine, other vehicle, and a server. For example, the communication device 22 transmits and receives information regarding traffic equipment, information regarding the other vehicle, probe information, or the latest map information 50. Note that the map information 50 is stored in a predetermined memory region of a storage device 52 provided for the control system 16 or in the navigation device 24.

The navigation device 24 includes a satellite positioning device that can detect the current position of the host vehicle 12, and a user interface (for example, a touch panel type display, a speaker, and a microphone). In addition, the navigation device 24 calculates a route to the designated destination on the basis of the current position of the host vehicle 12 or the user designated position, and outputs the route to the control system 16. The route calculated by the navigation device 24 is stored as route information 54 in the predetermined memory region of the storage device 52.

The vehicle sensor 26 includes a speed sensor that detects the travel speed (vehicle speed) of the host vehicle 12, an acceleration sensor that detects acceleration, a lateral acceleration sensor that detects lateral acceleration, a yaw rate sensor that detects angular velocity around a vertical axis, an orientation sensor that detects an orientation/direction, and an inclination sensor that detects inclination, and outputs a detection signal from each sensor to the control system 16. These detection signals are stored as host vehicle information 56 in the predetermined memory region of the storage device 52.

The automated driving switch 28 includes, for example, a pressing button type hardware switch or a software switch using the navigation device 24. The automated driving switch 28 is configured to be able to switch between a plurality of driving modes by a manual operation of the user including the driver.

The operation device 30 includes an accelerator pedal, a steering wheel, a brake pedal, a shift lever, and a direction indicating lever. The operation device 30 is provided with the operation detection sensor 32 that detects whether a driver's operation is performed, the operation amount, or an operation position.

The operation detection sensor 32 outputs to a travel control unit 58 of the control system 16 to be described below, the accelerator stepping amount (accelerator opening), the steering operation amount (steering amount), the brake stepping amount, a shift position, a right/left turning direction, or the like as a detection result.

<1.3 Specific Structure of Output System Device Group 18>

The driving force device 34 is structured by a driving force ECU (Electronic Control Unit) and a driving source including an engine and a driving motor. The driving force device 34 generates travel driving force (torque) of the host vehicle 12 in accordance with a travel control value that is input from the travel control unit 58, and transmits the travel driving force to the wheels directly or through a transmission.

The steering device 36 includes an EPS (electric power steering system) ECU and an EPS device. The steering device 36 changes the direction of the wheels (steering wheels) in accordance with the travel control value that is input from the travel control unit 58.

The braking device 38 is, for example, an electric servo brake that is used in combination with a hydraulic brake, and includes a brake ECU and a brake actuator. The braking device 38 brakes the wheels in accordance with the travel control value that is input from the travel control unit 58.

The notification device 40 includes a notification ECU, a display device, and an acoustic device. The notification device 40 performs notification operation regarding the automated driving or the manual driving in accordance with a notification instruction that is output from a notification control unit 60 of the control system 16 to be described below. The direction indicator 42 performs the notification operation regarding the right or left turn of the host vehicle 12 in accordance with the notification instruction output from the notification control unit 60.

<1.4 Structure of Control System 16>

The control system 16 is formed by one or a plurality of ECUs, and includes various function achievement units in addition to the storage device 52, the travel control unit 58, and the notification control unit 60 described above. The function achievement unit in this embodiment is a software function unit that achieves a function when one or a plurality of CPUs (Central Processing Units) execute programs stored in the storage device 52 that is non-transitory. The function achievement unit may alternatively be a hardware function unit including an integrated circuit such as an FPGA (Field-Programmable Gate Array).

The control system 16 includes an external environment recognition unit 62, an action plan unit 64, and a human body handling unit 66 in addition to the storage device 52, the travel control unit 58, and the notification control unit 60.

The external environment recognition unit 62 recognizes lane marks (white lines) on both sides of the host vehicle 12 with reference to various pieces of information input from the input system device group 14 (such as external environment information from external environment sensor 20) and then, generates "static" external environment recognition information including positional information of a stop line or a traffic light, or a travel possible area. In addition, the external environment recognition unit 62 generates "dynamic" external environment recognition information including an obstacle such as a parked or stopped vehicle, a traffic participant such as a person or other vehicle, or the color of the traffic signal with reference to various pieces of information that are input.

Figure 2:
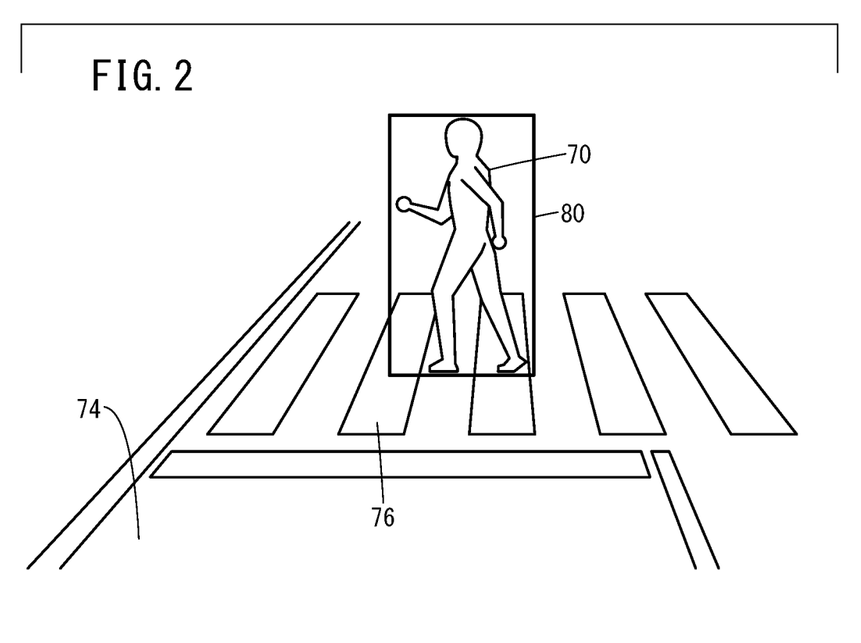
FIG. 2 is an explanatory diagram schematically illustrating a case where a human body crosses ahead of the host vehicle.

The action plan unit 64 creates an action plan (events in time series) for each travel section on the basis of a recognition result from the external environment recognition unit 62, and updates the action plan as necessary. Examples of the kind of events include causing the host vehicle 12 to travel smoothly when the human body 70 exists ahead of the host vehicle 12 as illustrated in FIG. 2. Note that in the present embodiment, the human body 70 includes (1) a pedestrian, (2) a driver of a movable body including a two-wheeled or a four-wheeled vehicle, and (3) a traffic control person who controls a traffic flow at an intersection or the like, such as a police officer or a construction crew. In the example to be described below, the human body 70 is a pedestrian.

The action plan unit 64 generates a travel trajectory (target behavior in time series) that follows the created action plan, by using the map information 50, the route information 54, and the host vehicle information 56 read out from the storage device 52. Specifically, this travel trajectory is a time-series data set whose data units are a position, a posture angle, speed, acceleration, a curvature, a yaw rate, and a steering angle.

The human body handling unit 66 performs a process for recognizing the human body 70 existing around the host vehicle 12 by using various pieces of information from the external environment recognition unit 62, and handling the recognized human body 70. In addition, the human body handling unit 66 outputs the information about a result of handling the recognized human body 70 to the action plan unit 64.

In this case, the human body handling unit 66 functions as an external environment information acquisition unit 66a, a human body specifying unit 66b (human body information acquisition unit), a quasi-skeleton estimation unit 66c, a distance measurement execution determination unit 66d, a distance measurement instruction unit 66e, a human body recognition process unit 66f, and a travel control change process unit 66g. The functions of these elements of the human body handling unit 66 are described below.

The travel control unit 58 decides the travel control values for performing the travel control of the host vehicle 12 including at least the acceleration/deceleration control of the host vehicle 12 in accordance with the travel trajectory (target behavior in time series) generated by the action plan unit 64. Then, the travel control unit 58 outputs the obtained travel control values to the driving force device 34, the steering device 36, and the braking device 38. The notification control unit 60 controls the driving of the notification device 40 or the direction indicator 42 in accordance with the travel trajectory generated by the action plan unit 64. The travel control unit 58 and the notification control unit 60 may hereinafter be collectively referred to as "driving control unit 72".

2. Operation of Driving Assistance Device 10

The driving assistance device 10 according to the present embodiment is structured as above. Subsequently, with reference to FIG. 2 to FIG. 7, the operation of the driving assistance device 10 is described. In this case, the host vehicle 12 including the driving assistance device 10 travels on a road 74 by the automated driving.

<2.1 Description of Human Body 70 and Road 74>

FIG. 2 is a diagram illustrating a state where the host vehicle 12 travels on the road 74. The host vehicle 12 is scheduled to travel on the road 74 along a scheduled travel route (not shown).

A pedestrian crossing 76 exists ahead in the road 74 where the host vehicle 12 travels. The human body 70 will cross the road 74 ahead of the host vehicle 12 by walking on the pedestrian crossing 76. In this case, the driving assistance device 10 (see FIG. 1) recognizes the human body 70 on the basis of the image data around the host vehicle 12 photographed by the camera 44, and detection results from the radar 46 and the LiDAR 48.

<2.2 Summary of Recognition Process for Recognizing Human Body 70>

Figure 3:
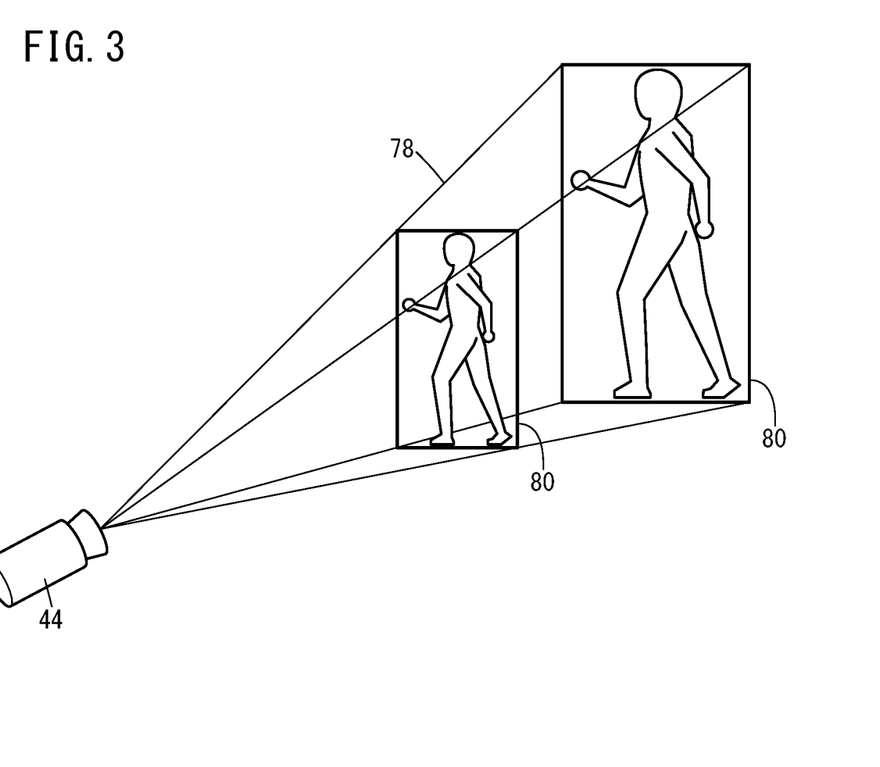
FIG. 3 illustrates a conventional method.

Next, the summary of the recognition process in which the driving assistance device 10 recognizes the human body 70 is described with reference to FIG. 3 and FIG. 4. FIG. 3 illustrates a conventional method and FIG. 4 illustrates a method according to the present embodiment.

In the conventional method illustrated in FIG. 3, first, a predetermined area ahead of the host vehicle 12 (see FIG. 1) including the human body 70 (see FIG. 2) is photographed by the camera 44. Next, on the basis of the image data photographed by the camera 44, a quasi-pyramid 78 with its top (reference position) coinciding with the position of the camera 44 is set. The pyramid 78 includes a two-dimensional rectangular frame 80 that is also referred to as "BBOX" including the human body 70 in the image data. Next, the distances to an inner part of the pyramid 78 are measured by the radar 46 or the LiDAR 48. Then, the human body 70 is recognized by using the distances to the inner part of the pyramid 78 that are measured by the radar 46 or the LiDAR 48, and the image of the human body 70.

In the conventional method in FIG. 3, however, the distances to the entire inner part of the pyramid 78 are measured. Therefore, the distances to the inner part of the pyramid 78 other than the human body 70 present in the pyramid 78 are also measured. As a result, in the case of performing the recognition process for recognizing the human body 70 using the measured distances, the distances other than those to the human body 70 are the noise. Thus, it is difficult to accurately recognize the human body 70 and the process burden in the recognition process is large.

Figure 4:
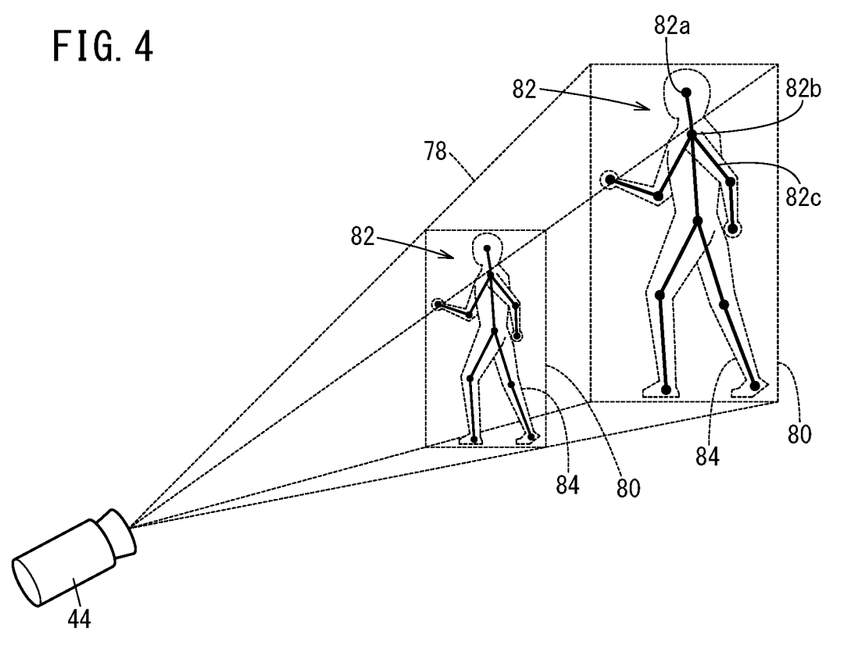
FIG. 4 illustrates a method according to the present embodiment.

On the other hand, in the method according to the present embodiment illustrated in FIG. 4, the predetermined area ahead of the host vehicle 12 (see FIG. 1) including the human body 70 (see FIG. 2) is photographed by the camera 44 and then, the image of the human body 70 is specified in the image data obtained by the camera 44. Next, by using the image of the human body 70, a quasi-skeleton 82 imitating the skeleton of the human body 70 is estimated. Then, by the radar 46 or the LiDAR 48, the distances to parts of the human body 70 that correspond to the quasi-skeleton 82 (a body surface that covers the muscles or the like around the bones of the human body 70) are measured. Next, by using the distances measured by the radar 46 or the LiDAR 48 and the image of the human body 70, the human body 70 is recognized.

Therefore, in the method according to the present embodiment, the distance is measured in the narrowed range focusing the parts of the human body 70 that correspond to the quasi-skeleton 82. That is to say, in the pyramid 78, it is very likely that the human body 70 exists in the place corresponding to the quasi-skeleton 82. Therefore, by measuring the distances in the narrowed range, the measurement of the distances other than those to the human body 70 can be suppressed and the noise is reduced; thus, the human body 70 can be recognized more accurately.

<2.3 Operation of Driving Assistance Device 10>

Next, the operation of the driving assistance device 10 for specifically performing the aforementioned method according to the present embodiment is described with reference to flowcharts in FIG. 5 to FIG. 7. The human body handling unit 66 performs the operation in FIG. 5 to FIG. 7.

Figure 5:
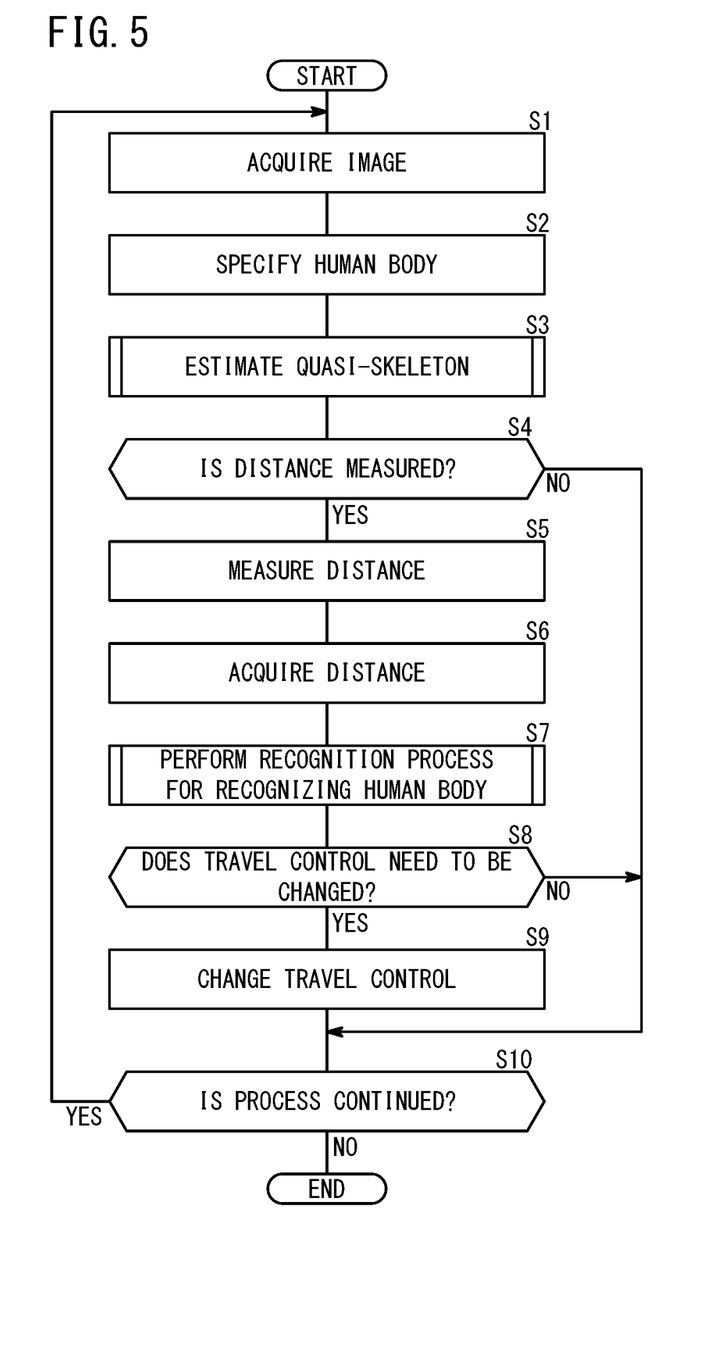
FIG. 5 is a flowchart illustrating operation of the driving assistance device in FIG. 1.

First, in step S1 in FIG. 5, the external environment information acquisition unit 66a (see FIG. 1) of the human body handling unit 66 acquires the external environment information, for example, the image data obtained by the camera 44.

In step S2, the human body specifying unit 66b extracts (acquires), as the human body information, the image of the human body 70 (see FIG. 2) existing around (ahead of) the host vehicle 12 in the image data.

In step S3, the quasi-skeleton estimation unit 66c estimates the quasi-skeleton 82 of the human body 70 on the basis of the extracted human body information. FIG. 6 is a flowchart illustrating the details of the process in step S3.

As illustrated in FIG. 4, the quasi-skeleton 82 includes a plurality of human body characteristic parts 82a corresponding to human body parts that feature the human body 70, such as a hand and a head of the human body 70 (see FIG. 2), a plurality of quasi-joint parts 82b corresponding to joints of the human body 70, and axis parts 82c with a linear shape corresponding to bones connecting between the human body characteristic parts 82a and the quasi-joint parts 82b in accordance with a human body skeleton structure.

Figure 6:
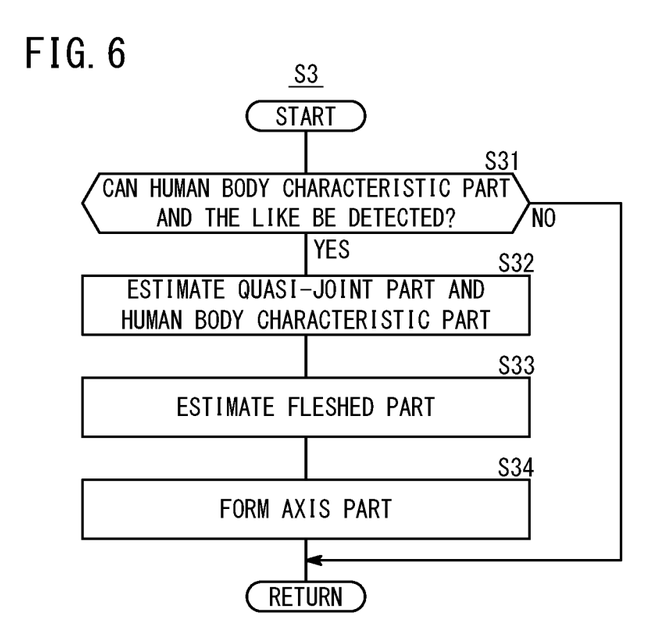
FIG. 6 is a flowchart illustrating a detailed process in step S3 in FIG. 5.

First, in step S31 in FIG. 6, the quasi-skeleton estimation unit 66c determines whether the human body characteristic parts 82a and the quasi-joint parts 82b can be detected from the human body information.

If the human body characteristic parts 82a and the quasi-joint parts 82b can be detected (step S31: YES), the quasi-skeleton estimation unit 66c estimates, in the next step S32, the positions of the human body characteristic parts 82a and the quasi-joint parts 82b by an estimation method using a known deep learning source, for example "OpenPose".

In step S33, the quasi-skeleton estimation unit 66c estimates a fleshed part 84 corresponding to, for example, the muscle around the bones of the human body 70 (parts covered with body surface) on the basis of the positions of the estimated human body characteristic parts 82a and quasi-joint parts 82b.

In step S34, the quasi-skeleton estimation unit 66c connects between the human body characteristic parts 82a and the quasi-joint parts 82b with straight lines so as to pass the inside (center) of the fleshed part 84 and estimates the connecting lines as the axis parts 82c.

Note that if the quasi-skeleton 82 cannot be estimated from the human body information in step S31 (step S31: NO), the quasi-skeleton estimation unit 66c cancels the estimation process for estimating the quasi-skeleton 82 and skips the processes of steps S32 to S34.

Back to FIG. 5, in step S4, the distance measurement execution determination unit 66d determines whether to measure the distance to the human body 70. In the case where the quasi-skeleton 82 is estimated in step S3, the distance measurement execution determination unit 66d determines that the distance to the human body 70 can be measured on the basis of the quasi-skeleton 82 (step S4: YES).

In step S5, the distance measurement instruction unit 66e having received an affirmative determination result in step S4 controls the radar 46 or the LiDAR 48 to measure the distance to the body surface of the human body 70 that corresponds to the quasi-skeleton 82. Thus, the radar 46 or the LiDAR 48 measures the distance to the body surface of the human body 70 that corresponds to the quasi-skeleton 82, on the basis of the instruction from the distance measurement instruction unit 66e. As a result, in step S6, the external environment information acquisition unit 66a can acquire a result of measuring the distance to the body surface of the human body 70 that corresponds to the quasi-skeleton 82 from the radar 46 or the LiDAR 48.

Alternatively, in step S5, the distance measurement instruction unit 66e may instruct the external environment information acquisition unit 66a to acquire only the result of measuring the distance to the body surface of the human body 70 corresponding to the quasi-skeleton 82 among the results of measuring the distances by the radar 46 or the LiDAR 48. Thus, in step S6, the external environment information acquisition unit 66a acquires only the result of measuring the distance to the body surface of the human body 70 corresponding to the quasi-skeleton 82.

In step S7, the human body recognition process unit 66f performs the recognition process for recognizing the human body 70 on the basis of the distance acquired in step S6 and the human body information specified in step S2. FIG. 7 is a flowchart illustrating the details of the process in step S7.

Figure 7:
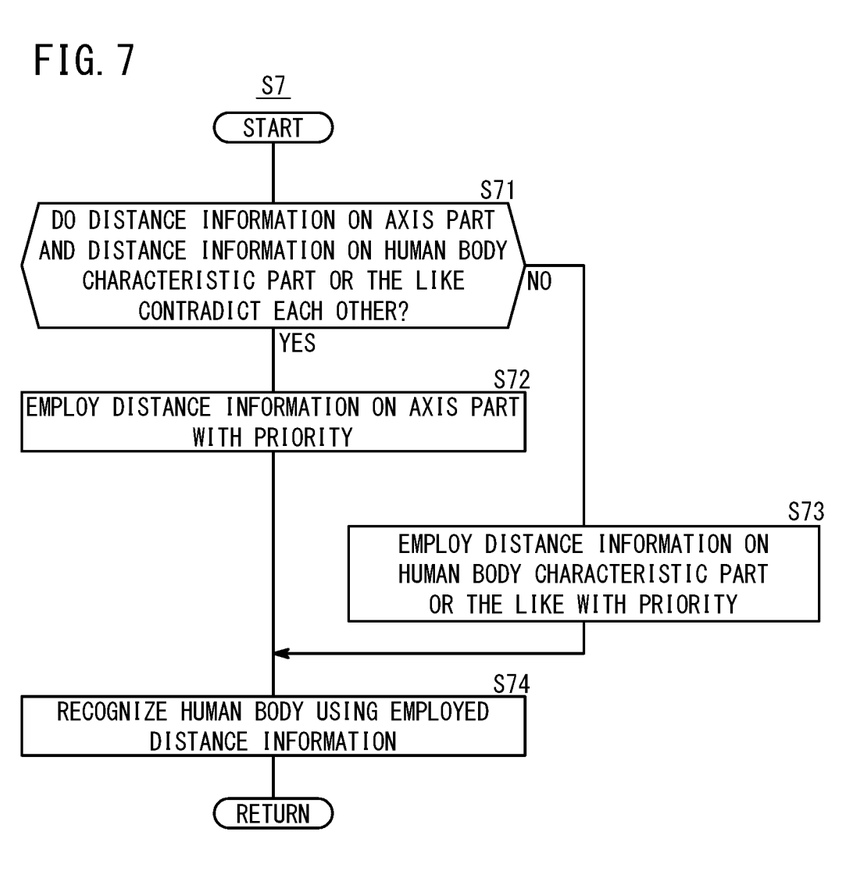
FIG. 7 is a flowchart illustrating a detailed process in step S7 in FIG. 5.

In step S71 in FIG. 7, first, the human body recognition process unit 66f determines whether, among the results of measuring the distances (distance information), the distance information of the body surface of the human body 70 corresponding to the axis part 82c and the distance information of the body surface of the human body 70 corresponding to the human body characteristic part 82a or the quasi-joint part 82b contradict each other.

As described above, the axis part 82c is a linear part in the quasi-skeleton 82. On the other hand, the human body characteristic part 82a or the quasi-joint part 82b is a point part or a part with a certain volume in the quasi-skeleton 82. Therefore, the distance information concerning the axis part 82c has, relatively, higher accuracy than the distance information concerning the human body characteristic part 82a or the quasi-joint part 82b.

In view of this, if both pieces of distance information contradict each other (step S71: YES), the human body recognition process unit 66f employs, in step S72, the distance information concerning the axis part 82c having high accuracy giving priority thereto. On the other hand, if both pieces of distance information substantially coincide with each other (step S71: NO), the human body recognition process unit 66f employs, in step S73, the distance information concerning the human body characteristic part 82a or the quasi-joint part 82b giving priority thereto.

In the next step S74, the human body recognition process unit 66f recognizes the human body 70 using the distance information employed in step S72 or S73 and the human body information specified in step S2. Specifically, the shape of the human body 70 is specified on the basis of the human body information that is the image of the human body 70, and the position of the human body 70 from the host vehicle 12 is specified on the basis of the employed distance information.

Back to FIG. 5, in step S8, the travel control change process unit 66g determines whether the travel control of the host vehicle 12 needs to be changed. Specifically, if it is recognized that the human body 70 walks on the pedestrian crossing 76 ahead while the host vehicle 12 travels, the travel control change process unit 66g determines that it is necessary to change the travel control of the host vehicle 12 so as to generate a travel trajectory that decreases the vehicle speed of the host vehicle 12 or that makes the host vehicle 12 stop temporarily before the pedestrian crossing 76 (step S8: YES).

Then, in the next step S9, the travel control change process unit 66g outputs instruction contents for changing the travel control of the host vehicle 12 to the action plan unit 64 on the basis of the affirmative determination result in step S8. Thus, the action plan unit 64 updates the action plan in accordance with the received determination result from the travel control change process unit 66g. As a result, the travel control unit 58 controls each device in the output system device group 18 on the basis of the updated action plan (travel trajectory) so that the vehicle speed of the host vehicle 12 can be decreased or the host vehicle 12 can be stopped temporarily in front of the pedestrian crossing 76.

After that, the process advances to step S10, and in the case where the process is continued in the human body handling unit 66 (step S10: YES), the process returns to step S1 and the process in steps S1 to S10 is repeated.

On the other hand, if the human body information cannot be specified in step S2 or the estimation process for estimating the quasi-skeleton 82 cannot be performed in step S3 (step S31: NO), the distance measurement execution determination unit 66d determines, in step S4, that the distance measurement by the radar 46 or the LiDAR 48 cannot be performed (step S4: NO), and the process in steps S5 to S9 is skipped and the process advances to step S10.

If the travel by the automated driving is stopped in step S10 (step S10: NO), the process in FIG. 5 to FIG. 7 ends.

<2.4 Modification>

In the description made with reference to FIG. 5 to FIG. 7, the radar 46 or the LiDAR 48 measures the distance to the human body 70 on the basis of the quasi-skeleton 82. Incidentally, even if the quasi-skeleton 82 cannot be estimated (step S31 in FIG. 6: NO), the distance measurement execution determination unit 66d may permit the distance measurement by the radar 46 or the LiDAR 48 in step S4. In this case, the radar 46 or the LiDAR 48 measures in step S5 the distance to the human body 70 in accordance with the conventional method illustrated in FIG. 3. Therefore, in step S7, the recognition process for recognizing the human body 70 is performed on the basis of the distances in the pyramid 78.

3. Effects of the Present Embodiment

As described above, the driving assistance device 10 according to the present embodiment is the device that assists the driving of the host vehicle 12 (movable body), and includes: the camera 44 (visual sensor) configured to acquire the image around the host vehicle 12; the radar 46 or the LiDAR 48 (distance measurement sensor) configured to measure the distance to the object around the host vehicle 12; the human body specifying unit 66b (human body information acquisition unit) configured to acquire, as the human body information, the image of the human body 70 existing around the host vehicle 12 in the image data acquired by the camera 44; and the quasi-skeleton estimation unit 66c configured to estimate the quasi-skeleton 82 of the human body 70 from the human body information. In this case, the radar 46 or the LiDAR 48 measures the distance to the part of the human body 70 that corresponds to the quasi-skeleton 82 (the body surface that covers the fleshed part 84).

According to this structure, the quasi-skeleton 82 of the human body 70 is estimated from the image of the human body 70 (human body information) and only the distance to the part of the human body 70 that corresponds to the estimated quasi-skeleton 82 is measured with the radar 46 or the LiDAR 48. Thus, the measurement range of the radar 46 or the LiDAR 48 can be narrowed to the human body 70 part only, and the measurement of the distances other than those to the human body 70 can be suppressed. As a result, the human body 70 can be recognized with high accuracy.

Furthermore, by estimating the quasi-skeleton 82 at the stage of the image recognition process in step S3 in FIG. 5, the number of points that the radar 46 or the LiDAR 48 detects in the three-dimensional space (pyramid 78) can be drastically reduced in the distance measurement in step S5. Accordingly, the processing speed in the recognition process for recognizing the human body 70 in step S7 can be improved and at the same time, the recognition process for recognizing the human body 70 including the estimation process for estimating the three-dimensional position of the human body 70 can be performed with high accuracy.

Here, the quasi-skeleton 82 includes the human body characteristic part 82a including at least the hand or the head of the human body 70, and the quasi-joint part 82b. The radar 46 or the LiDAR 48 measures the distance to the part of the human body 70 that corresponds to the human body characteristic part 82a or the quasi-joint part 82b (the body surface that covers the fleshed part 84). Thus, the measurement of the distances other than those to the human body 70 can be effectively suppressed and the human body 70 can be recognized with higher accuracy.

The driving assistance device 10 further includes the human body recognition process unit 66f configured to recognize the human body 70 on the basis of the distance to the human body 70 measured by the radar 46 or the LiDAR 48, and the human body information. The quasi-skeleton 82 includes the human body characteristic part 82a, a plurality of the quasi-joint parts 82b, and the axis parts 82c that connect between the human body characteristic part 82a and the quasi-joint parts 82b in accordance with the human body skeleton structure. The radar 46 or the LiDAR 48 further measures the distance to the part of the human body 70 that corresponds to the axis part 82c (the body surface that covers the fleshed part 84).

When the distance to the part of the human body 70 that corresponds to the axis part 82c and the distance to the part of the human body 70 that corresponds to the human body characteristic part 82a or the quasi-joint part 82b are different, the human body recognition process unit 66f is configured to recognize the human body 70 by using the distance to the part of the human body 70 that corresponds to the axis part 82c giving priority thereto.

The axis part 82c is the linear part in the quasi-skeleton 82. Therefore, the distance to the axis part 82c is measured with higher accuracy than the distance to the human body characteristic part 82a or the quasi-joint part 82b. Accordingly, by employing the distance to the part of the human body 70 that corresponds to the axis part 82c giving priority thereto, the human body 70 can be recognized with high accuracy.

When the human body specifying unit 66b is able to acquire the human body information but it is difficult for the quasi-skeleton estimation unit 66c to estimate the quasi-skeleton 82 from the human body information, the radar 46 or the LiDAR 48 may measure the distance to the peripheral part of the host vehicle 12 (in the pyramid 78) that corresponds to the frame 80 surrounding the human body 70 (human body information). Thus, it is possible to prevent the recognition process for recognizing the human body 70 from being interrupted during the automated driving of the host vehicle 12.

The radar 46 or the LiDAR 48 measures the distance to the part of the human body 70 that corresponds to the region that is a predetermined distance away from the quasi-skeleton 82 (the body surface that covers the fleshed part 84). Thus, the distance to the human body 70 can be measured for sure.

Note that the human body 70 includes a pedestrian, a driver of other movable body including a two-wheeled or four-wheeled vehicle, or a traffic control person who controls a traffic flow, and the camera 44 is configured to acquire the image of the human body 70 in the range adjacent to the road 74 (vehicle road) where the host vehicle 12 travels. By recognizing the human body 70 having these attributes with the use of the quasi-skeleton 82, the position and the motion of each human body characteristic part 82*a* can be recognized. As a result, the gesture or the like of the human body 70 can be recognized.

In this case, for example, on the basis of the human body characteristic part 82*a* or the target or the like that can be recognized even when overlapping with the human body 70 in the image acquired by the camera 44, the attribute of the human body 70 may be added and the intention of the gesture of the human body 70 may be estimated. For example, with respect to a predetermined motion of the human body 70 who overlaps with a motorcycle ahead of the host vehicle 12 in the image, it is possible to recognize that "the host vehicle 12 can overtake the motorcycle". In another example, an operator (driver) in a four-wheeled vehicle ahead of the host vehicle 12 puts his hand out of the window and lowers the hand in the image. In this case, by capturing this motion, the motion may be recognized as a sign expressing that the vehicle ahead of the host vehicle 12 intends to stop.

Note that the process for estimating the intention of the human body 70 as described above is performed for the traffic participants including the pedestrian, the operator, and the traffic control person; therefore, it is only necessary that the image of the human body 70 is acquired in the predetermined range adjacent to the road 74 and the human body 70 is detected using this image.

Note that the present invention is not limited to the aforementioned embodiment and various structures can be employed on the basis of the description in this specification.

What is claimed is:

1. A driving assistance device configured to assist driving of a movable body, comprising:
    one or more processors that execute computer-executable instructions stored in a memory,
    a visual sensor configured to acquire an image around the movable body; and
    a distance measurement sensor configured to measure a distance to an object around the movable body,
    wherein the one or more processors execute the computer-executable instructions to cause the driving assistance device to:
        acquire, as human body information, an image of a human body existing around the movable body in the image acquired by the visual sensor;
        estimate a quasi-skeleton of the human body from the human body information;
        instruct the distance measurement sensor to measure the distance to a part of the human body that corresponds to the estimated quasi-skeleton;
        instruct the distance measurement sensor to measure the distance to the part of the human body that corresponds to the quasi-skeleton; and
    when the human body information is acquired but the quasi-skeleton cannot be estimated from the human body information, measure the distance to a peripheral part of the movable body that corresponds to a frame surrounding the human body information on a basis of a ratio of the distance to an entire of the image acquired by the visual sensor and including the peripheral part.

2. The driving assistance device according to claim 1, wherein:
    the quasi-skeleton includes a human body characteristic part including at least a hand or a head of the human body, and a quasi joint part; and
    the distance measurement sensor is configured to measure a distance to a part of the human body that corresponds to the human body characteristic part or the quasi joint part.

3. The driving assistance device according to claim 2, wherein the one or more processors cause the driving assistance device to recognize the human body on the basis of the distance to the human body measured by the distance measurement sensor and the human body information, wherein:
    the quasi-skeleton includes the human body characteristic part, a plurality of the quasi-joint parts, and axis parts that connect between the human body characteristic part and the quasi-joint parts in accordance with a human body skeleton structure;
    the distance measurement sensor is configured to further measure a distance to a part of the human body that corresponds to the axis part; and
    when the distance to the part of the human body that corresponds to the axis part and the distance to the part of the human body that corresponds to the human body characteristic part or the quasi-joint part are different, the one or more processors cause the driving assistance device to recognize the human body by using the distance to the part of the human body that corresponds to the axis part giving priority thereto.

4. The driving assistance device according to claim 1, wherein the distance measurement sensor is configured to measure a distance to a part of the human body that corresponds to a region that is a predetermined distance away from the quasi-skeleton.

5. The driving assistance device according to claim 1, wherein:
    the human body includes a pedestrian, a driver of other movable body including a two-wheeled or four-wheeled vehicle, or a traffic control person who controls a traffic flow; and
    the visual sensor is configured to acquire the image of the human body in a range adjacent to a road where the movable body travels.

* * * * *